March 6, 1928.
J. A. SMITH
1,661,774
ROTARY SAW
Filed Dec. 15, 1924
3 Sheets-Sheet 1
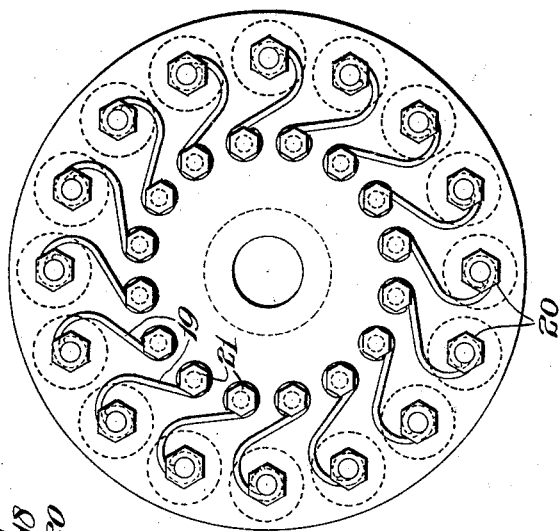
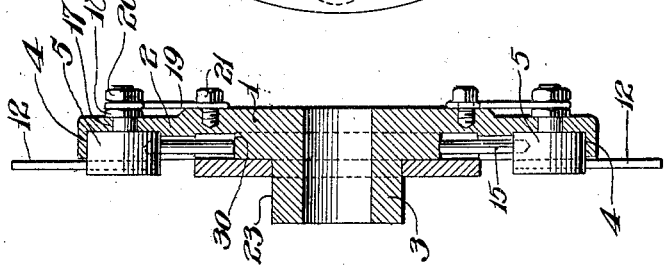
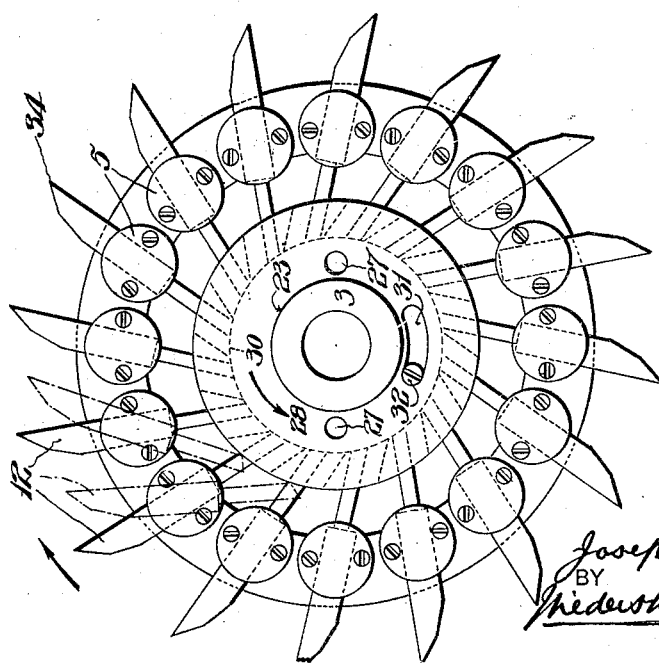
INVENTOR:
Joseph A. Smith
BY
ATTORNEYS.

March 6, 1928.  J. A. SMITH  1,661,774
ROTARY SAW
Filed Dec. 15, 1924  3 Sheets-Sheet 2
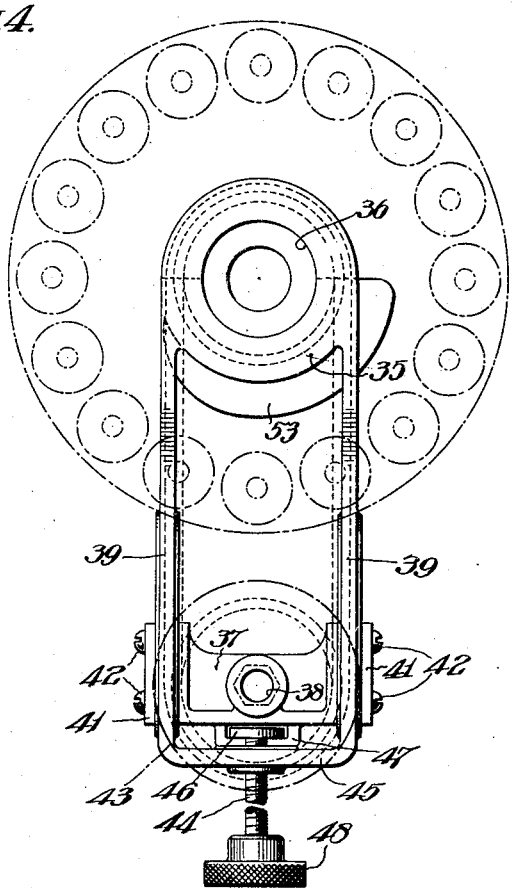
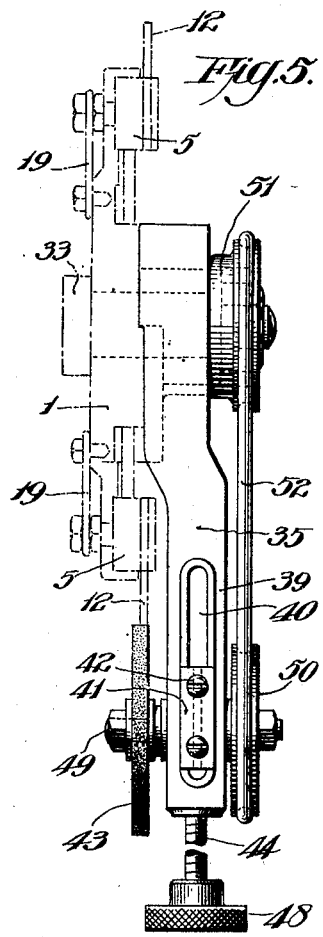
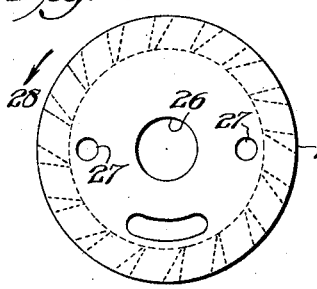
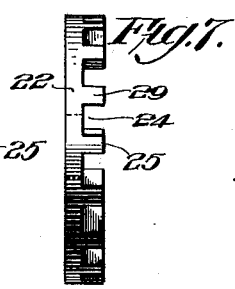
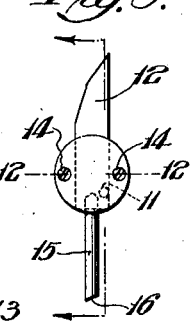
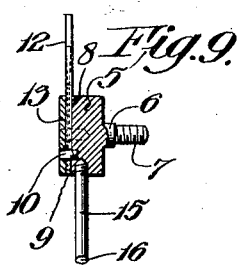

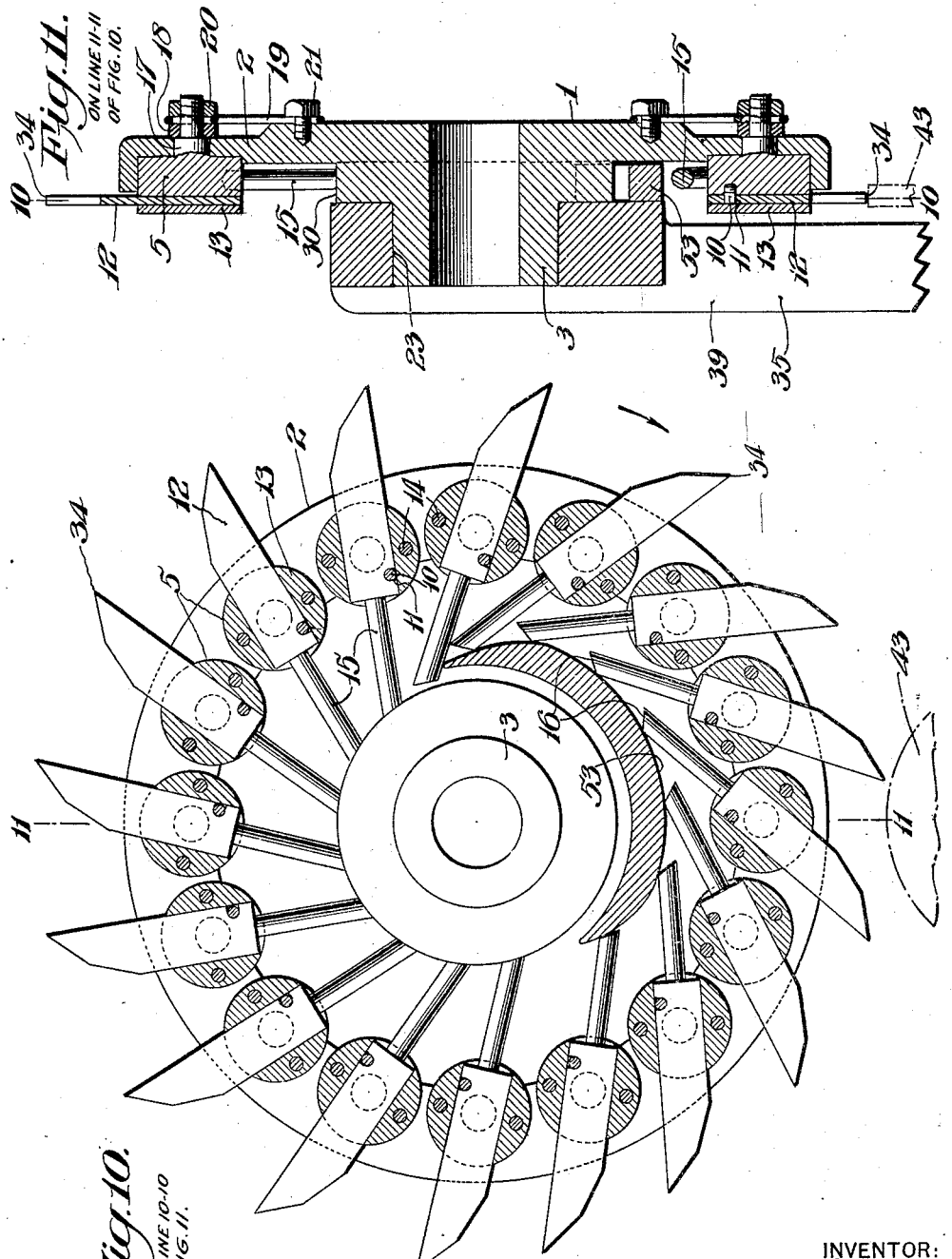

Patented Mar. 6, 1928.

1,661,774

UNITED STATES PATENT OFFICE.

JOSEPH A. SMITH, OF COLLINGSWOOD, NEW JERSEY.

ROTARY SAW.

Application filed December 15, 1924. Serial No. 755,815.

My invention relates to a new and useful rotary saw for cutting metal, wood, fibrous material and the like, and it relates more particularly to a rotary saw having a plurality of teeth or cutters around the periphery thereof, which may be deflected from the cutting positions to certain other positions in which said individual teeth or cutters may be ground and sharpened without removing the same from the holders or the rotary saw.

My invention further relates to certain new and novel means of deflecting all the teeth or cutters of said rotary saw in unison, from the outer cutting positions to the inner grinding or sharpening positions, and to deflect the same back again into the outer cutting positions and to positively retain the same in such positions while cutting.

My invention further relates to a new and useful grinding and sharpening attachment for such rotary saw, by means of which the teeth of said rotary cutter may be sharpened and ground either while the saw is inoperative, that is, while not cutting with it or while not in use, or whereby the teeth of said rotary saw may be ground or sharpened continuously while the saw is in operation and is revolving and cutting.

With the above ends in view my invention consists of a certain novel rotary saw head or housing having a plurality of rotatable cutter holders pivotally mounted around and near the periphery thereof, cutters carried by said cutter holders, deflecting arms carried by said cutter holders and extending inwardly towards the center of said head, tensioning means for retaining said cutters in the outer or cutting positions, and means for deflecting said cutters into the inner or grinding positions, either simultaneously or in succession.

My invention further consists of a certain novel grinding attachment adapted to be mounted on and to cooperate with said rotary saw head, to effect a grinding or sharpening of the individual teeth or cutters of said saw as the same revolves, either while the saw is in operation, or while the same is inoperative.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

In the figures in which like reference characters indicate like parts:—

Figure 1 represents a side elevation of a rotary saw embodying my invention.

Figure 2 represents a section on line 2—2 of Figure 1.

Figure 3 represents a side elevation similar to that shown in Figure 1, showing the opposed side or face of my novel rotary saw.

Figure 4 represents a side elevation of my novel grinding or sharpening attachment as applied to my novel rotary saw.

Figure 5 represents a front elevation of the same.

Figure 6 represents a side elevation of the adjusting collar shown in Figure 1.

Figure 7 represents a front elevation of the same.

Figure 8 represents a side elevation of one of the cutter holders and cutters shown in Figures 1 and 2 particularly.

Figure 9 represents a section on line 9—9 of Figure 8.

Figure 10 represents a section on line 10—10 of figure 5.

Figure 11 represents a section on line 11—11 of figure 4.

Figure 12 represents a section on line 12—12 of Figure 8.

Referring to the drawings, 1 represents the saw head or housing of my novel rotary saw, consisting of the flange portion 2 and the hub portion 3, and having a plurality of substantially equi-distant annular recesses 4, around and near the periphery thereof, as shown in Figures 1 and 2, which annular recesses act as bearing seats for the cutter holders 5 which are rotatably mounted within the same. Each of the cutter holders 5, as will be seen by reference to Figures 1, 2, 8 and 9 and 12 consists of the cylindrical cutter holder 5, having a coaxial stem 6 fixed to or integral with one face thereof, the lower portion 7 of which is threaded so as to receive the correspondingly threaded screw nuts 18 and 20. The upper surface 8 of said cutter holder is provided with a recess 9 extending diametrically across the upper surface 8 of said holder, and having a bottom surface of said recess inclined at a slight degree so as to properly seat a strip of the usual "cutting off" tool steel, which is tapered back from the cutting edge as shown particularly in Figure 12. The dowl pin 10, secured in the recess 9, and a corresponding notch 11, in the edge of the cutter or tooth 12, interlock as shown in Figures 8 and 9, so as to retain the cutter in said recess 9 against any longitudinal movement therein. The cap plate 13 is superimposed upon the face 8 of the cutter holder 5 and is secured thereto in a removable manner, by means of the two screws 14. The inner surface of the cap plate 13 is also tapered to correspond to the tapered tool steel forming the cutter 12. The arm 15, having the bevelled end 16, is secured to the body 5 of the cutter holder in any suitable manner, as by threading it into the same as shown in Figure 9, so as to extend substantially radially from the cylindrical body of said cutter holder 5. If desired, the arm 15 may be formed integral with the cutter holder 5. The cutter holders 5 are seated in corresponding recesses 4, around the periphery of the body 1 of the rotary saw, having their stems extending through corresponding openings 17 in the flange portion 2 of said body 1 and having the nuts 18 threaded on to the screw ends of said stems 6, so as to retain said cutter holders in said recesses 4 and permit the same to rotate freely. The springs 19 are secured at one of their ends between the nuts 18 and the second locking or fixing nuts 20 on said threaded ends 7 of the stems 6, and are secured at the other ends thereof, by means of the studs or screws 21, threaded into the flange portion 2 of the rotary saw. The springs 19 exert a torque on stems 6 so as to retain the cutter holders 5 and hence the cutters 12 in the outer or cutting positions shown in full lines in Figure 1, with the bevelled ends 16 of the arms 15 bearing and resting against the annular cylindrical surface 30 of the body 1 of the saw.

In one embodiment of my invention, wherein the teeth or cutters of my novel saw are ground or sharpened while the saw is not in use. I provide an adjusting or deflecting collar 22, rotatably mounted on the outer cylindrical surface 23 of the hub 3, of the body 1 of said saw. The collar 22 is provided with a series of slots 24 extending through the peripheral flange 25 of said collar, in a direction substantially tangent to the bearing opening 26 of said collar. The series of slots 24, corresponding to the series of arms 15, of the cutter holders 5, are adapted to receive said arms 15 in the normal, operative or cutting position of the cutters 12. The two holes 27 are provided in the face of said adjusting collar 22 so as to permit the engagement of said collar by a suitable sprocket wrench, not shown in the drawings, whereby the same may be turned in the direction of the arrow 28, shown in Figures 1 and 6. By turning the collar 22 in the direction of the arrow 28, by means of a sprocket wrench, the arms 12 will be forced out of the tangent slots 24, until the bevelled ends 16 thereof will rest on and bear against the corresponding peripheral surfaces 29 of the peripheral flange portion 25, of said collar 22, as shown particularly in the dotted lines in Figure 1. In order to confine the movement of the collar 22 within the desired limits, that is, between the position in which the arms 15 are entirely within the slots 24, and rest and bear against the annular surface 30 of the body 1 of the rotary saw, and the position in which the arms 15 rest against the outer peripheral surfaces 29 of the adjusting or deflecting collar 22, I provide an arcuate slot 31 through the face of said adjusting collar 22 of a suitable length, and provide a properly located stud or pin 32, fixed in the body 1 of the rotary saw, and passing through said arcuate slot 31.

My novel rotary saw is mounted on a suitable saw spindle 33, and thus mounted, may be used for cutting any material desired, in the usual manner. When the teeth or cutters 12 have become dull, and will not cut as clean as may be desired, the saw is stopped for an instant the collar 22 is turned in the direction of the arrow 28, by means of a suitable sprocket wrench engaging said collar by means of the holes 27, until all the cutters 12 are deflected into the inner positions shown in Figure 1. In this position a suitable sharpening or grinding wheel or upper sharpening implement is brought up to the cutters 12, and the saw revolved so as to cause engagement between the grinding wheel and each of the successive cutters 12, thereby sharpening each of said cutters uniformly. The angle at which the cutting edge 34 will be sharpened depends on the angle of deflection of the cutter 12, said angle of deflection being in turn fixed by the relative proportions of the arms 15 and collar 22, the angle of deflection and hence the angle of the cutting edge 34 being so set in any particular instance that when the cutters are brought back into the cutting positions, the angle at which the same have been ground, will be sufficient to give the necessary clearance for the best cutting of the particular material.

It is to be understood that since the clearance of the cutting edge 34 varies with the particular material to be cut, the angle at which the cutters 12 must be deflected from their cutting positions to their grinding or sharpening positions must vary, and depends entirely on the desired clearance.

If it is desired to grind and sharpen the cutters 12 continuously instead of periodically as described hereinbefore, and to sharpen said cutter while the saw is in operation and without the necessity of interrupting the work, I provide a novel grinding attachment for my novel rotary saw, consisting of a frame or housing 35, having a bearing opening 36 at the one end thereof, adapted to receive and revolve freely on the surface 23 of the hub 3, of the body 1 of my rotary saw; a bearing block 37 having a spindle bearing 38 therethrough, parallel to the bearing opening 36, slidably mounted within the frame 35, between the two parallel frame members 39 thereof, and adapted to slide radially with respect to the rotary saw. The bearing block 37 is provided with a sliding movement in the guide slots 40, in each of the frame members 39, and is retained by means of the plates 41, and the screw 42.

In order to adjust the distance of the bearing block 37, and hence of the grinding wheel 43 carried by said bearing block, with respect to the ends of the cutters 12, I provide a feed screw 44, threaded through a correspondingly threaded member 45 of the frame 35, and having a suitable head 46 engaging the bearing block 37 by means of the yoke 47. Thus by turning the knurled head 48, of the screw 44, the bearing block 37, and hence the grinding wheel 43 carried by said bearing block may be brought closer to or moved away from the cutters 12 as may be desired. The grinding wheel 43 is carried by a suitable spindle 49 rotatably mounted within the bearing opening 38, and having a pulley 50 mounted on the outer end thereof. A corresponding pulley 51 is mounted on the end of the saw spindle 33 in line with the pulley 50, and a flexible and expansible endless belt 52 is placed on the two pulleys 50 and 51, thereby causing the saw spindle 33 to impart the corresponding rotary motion to the grinding wheel spindle 49.

The cam 53 is secured to the frame 35 in such a position as to be in alignment with the ends 16 of the arms 15. Said cam is of such contour and of such arcuate extent, as to deflect the cutters 12 in succession, as the cutters are brought around to the grinding wheel by the rotation of the saw, and releasing the same into the normal or cutting positions as the cutters pass the grinding wheel.

When using this novel grinding attachment, the collar 22 is moved from the hub 3 and the grinding attachment is mounted in place thereof. When the grinding attachment is used, as will be seen from Figures 10 and 11, the saw may operate continuously without any interruption, the cutter being ground or sharpened with each revolution of the cutter as they pass the grinding wheel 43, by the proper deflection of said cutters by means of the cam 53 from which deflected positions said cutters are then released by said cam 53, and are drawn back into their normal or cutting positions by the spring 19, in which positions they are retained rigidly against the force exerted by the material on the cutting edge 34, by the engagement of the bevelled ends 16 of the arms 15, with the cylindrical surface 30 of the body 1 of the rotary saw. When my novel rotary saw is used in combination with my novel grinding attachment, the same may be retained inoperative by simply withdrawing the grinding wheel 43 by means of the feed screw 44.

My novel rotary saw is particularly useful and advantageous in cutting materials which dull the cutters quickly, as it affords ready means whereby the teeth may be sharpened without being moved from the body of the saw proper, or without the necessity of resetting or aligning or in any way adjusting the teeth after grinding, or removing the saw from the machine. My novel rotary saw and grinding attachment therefor, is particularly adapted for cutting such material as fiber, vulcanized fiber, and bakelite and some hard woods.

It will now be apparent that I have devised a novel and useful rotary saw and means for grinding the same which embodies the features of advantage enumerated as desirable in the statement of the invention and the above description, and while I have in the present instance shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent, is:—

1. In a device of the character stated, a rotatable housing, a plurality of cutters pivotally mounted near the periphery thereof, means limiting the pivotal movement of said cutters between outer and inner positions thereof, means for causing said cutters to assume their outer positions, and means for deflecting said cutters from their outer positions to their inner positions; the pivotal centers of said cutters being at a constantly fixed radial distance from the axis of rotation of said housing and being at a greater distance from said axis than said cutter deflecting means.

2. In a device of the character stated, a rotatable housing, a plurality of cutters pivotally mounted near the periphery thereof, means limiting the pivotal movement of said cutters between outer and inner positions thereof, means for causing said cutters to assume their outer positions, and means for simultaneously deflecting said cutters from their outer positions to their inner positions; the pivotal centers of said cutters being at a constantly fixed radial distance from the axis of rotation of said housing and being at a greater distance from said axis than said cutter deflecting means.

3. In a device of the character stated, a rotatable housing, a plurality of cutter holders rotatably mounted near the periphery of said housing, cutters carried by said cutter holders, and means common to each of said cutter holders and positioned centrally thereof for limiting the rotary movement of each of said cutter holders between cutting and sharpening positions of the respective cutters; the centers of rotation of said cutter holders being at constantly fixed radial distances from the axis of rotation of said housing and being at a greater distance from said axis than said cutter limiting means.

4. In a device of the character stated, a rotatable housing, a plurality of cutter holders rotatably mounted near the periphery of said housing, cutters demountably carried by said cutter holders, means common to each of said cutter holders and positioned centrally thereof for limiting the rotary movement of each of said cutter holders between cutting and sharpening positions of the respective cutters, and yieldable means for causing said cutter holders to assume their cutting positions; the centers of rotation of said cutter holders being at constantly fixed radial distances from the axis of rotation of said housing and being at a greater distance from said axis than said cutter limiting means.

5. In a device of the character stated, a rotatable housing, a plurality of cutter holders rotatably mounted near the periphery of said housing, cutters demountably carried by said cutter holders, means common to each of said cutter holders and positioned centrally thereof for limiting the rotary movement of each of said cutter holders between cutting and sharpening positions of the respective cutters, and means also common to said cutter holders and carried by said housing and rotatable with respect thereto, to revolve said cutter holders and to deflect said cutters from their cutting to their sharpening normal positions; the centers of rotation of said cutter holders being at constantly fixed radial distances from the axis of rotation of said housing and being at a greater distance from said axis than said cutter deflecting means.

6. In a device of the character stated, a rotatable housing, a plurality of cutter holders rotatably mounted near the periphery of said housing, cutters carried by said cutter holders, means limiting the rotary movement of each of said cutter holders between cutting and sharpening positions of the respective cutters, and means common to said cutter holders and carried by said housing and rotatable with respect thereto to simultaneously revolve said cutter holders and to deflect said cutters from their cutting to their sharpening normal positions; the centers of rotation of said cutter holders being at constantly fixed radial distances from the axis of rotation of said housing and being at a greater distance from said axis than said cutter deflecting means.

7. In a device of the character stated, a rotatable housing, a plurality of bearings near the periphery of said housing, cutter holders seated in said bearings and rotatable therein, cutters carried by said cutter holders in substantially radial cutting positions, means causing said cutters to assume normal cutting positions, means carried by said cutter holders, and means on said housing cooperating therewith for uniformly setting normal cutting positions of said cutters; the centers of rotation of said cutter holders being at constantly fixed radial distances from the axis of rotation of said housing and being at a greater distance from said axis than said cutter setting means on said housing.

8. In a device of the character stated, a rotatable housing, a plurality of bearing recesses near the periphery thereof, cutter holders rotatably mounted in said bearing recesses, cutters demountably carried by said cutter holders in substantially radial normal positions, deflecting arms rigidly carried by said cutter holders, and a setting surface on said housing adapted to engage said deflecting arms thereby to limit and set their normal cutting positions, and means carried by said housing and rotatable with respect thereto, for engaging said deflecting arms and deflecting the same and hence the cutters from their normal positions; the centers of rotation of said cutter holders being at constantly fixed radial distances from the axis of rotation of said housing and being at a greater distance from said axis than said cutter deflecting means.

9. In a device of the character stated, a rotatable housing, a plurality of bearing recesses near the periphery thereof, cutter holders rotatably mounted in said bearing recesses, cutters demountably carried by said cutter holders in substantially radial normal positions, deflecting arms rigidly carried by said cutter holders, and a setting surface on said housing adapted to engage said deflecting arms thereby to limit and set their normal cutting positions, and means carried by said housing and rotatable with respect thereto for simultaneously engaging said deflecting arms and deflecting the same and hence the cutters from their normal positions; the centers of rotation of said cutter holders being at constantly fixed radial distances from the axis of rotation of said housing and being at a greater distance from said axis than said cutter deflecting means.

10. In a device of the character stated, a substantially circular rotatable housing, a plurality of substantially cylindrical cutter holders rotatably mounted near the periphery thereof, cutters demountably carried by said cutter holders, deflecting arms carried by said cutter holders and extending inwardly, a fixed setting surface carried by said housing adapted to engage said deflecting arms thereby to limit the outer or cutting positions of said cutters, yieldable means urging said cutters into their outer or cutting positions with the deflecting arms bearing against said fixed setting surface, and a deflecting collar rotatably carried by said housing for deflecting said cutters to their inner sharpening positions; the centers of rotation of said cutter holders being at constantly fixed radial distances from the axis of rotation of said housing and being at a greater distance from said axis than said deflecting collar.

11. In a device of the character stated, a rotatable housing, a plurality of cutter holders rotatably mounted near the periphery thereof, cutters demountably carried by said cutter holders, setting and deflecting arms rigidly carried by said cutter holders and extending inwardly, a deflecting collar rotatably carried by said housing, tangent slots in said collar corresponding to said deflecting arms and adapted to receive the corresponding deflecting arms in their normal positions, a fixed setting surface carried by said housing for engaging the ends of said deflecting arms in their normal positions, setting surfaces on the outer periphery of said deflecting collar for engaging the ends of said setting arms in their deflected positions; the centers of rotation of said cutter holders being at constantly fixed radial distances from the axis of rotation of said housing and being at a greater distance from said axis than said deflecting collar.

JOSEPH A. SMITH.